May 7, 1929. L. M. PALMERO ET AL 1,712,398
AUTOMATIC DUMPING MECHANISM FOR VEHICLES
Filed Aug. 26, 1927 2 Sheets-Sheet 1
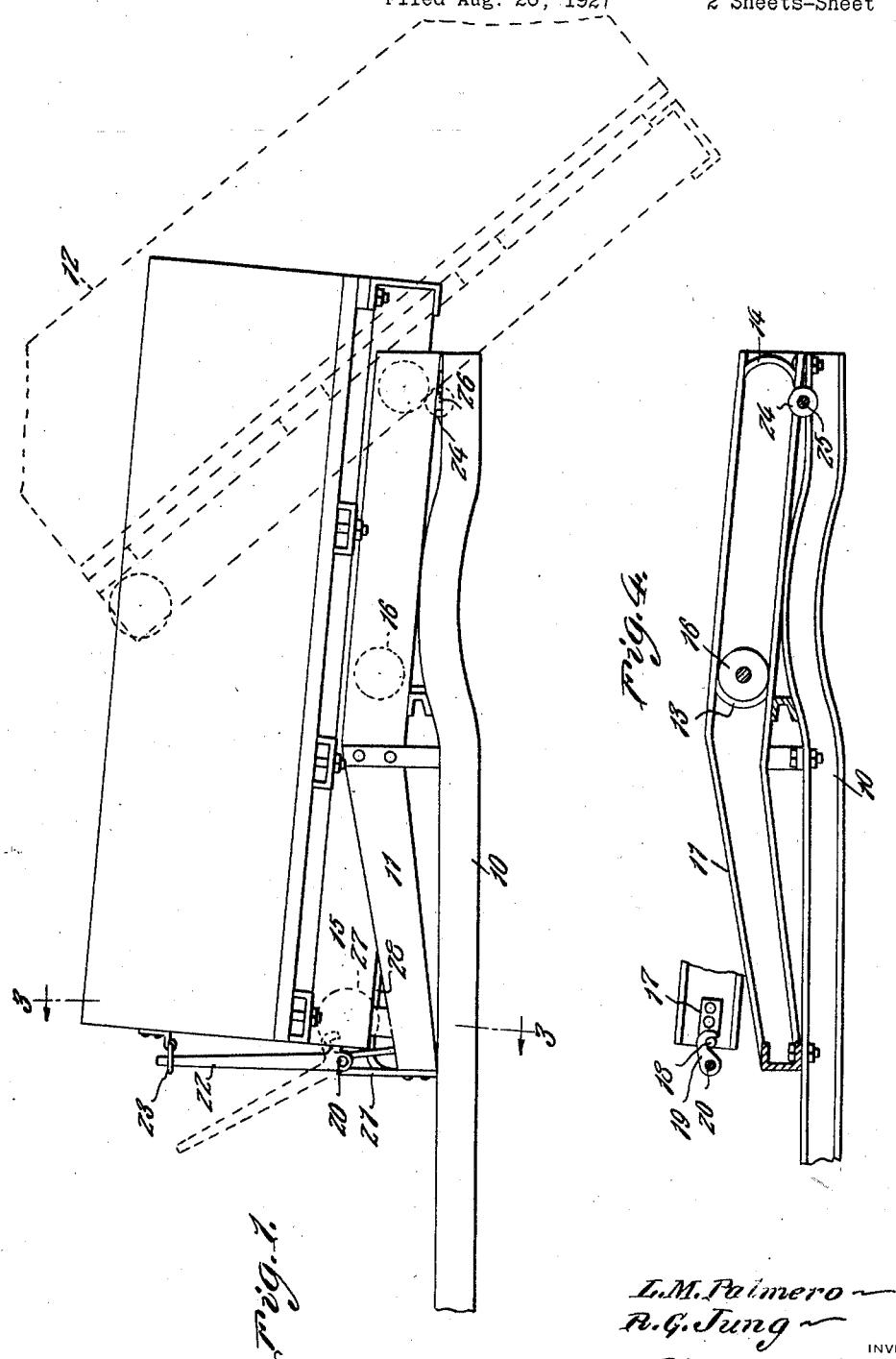
L.M. Palmero
R.G. Jung
INVENTORS
BY Victor J. Evans
ATTORNEY

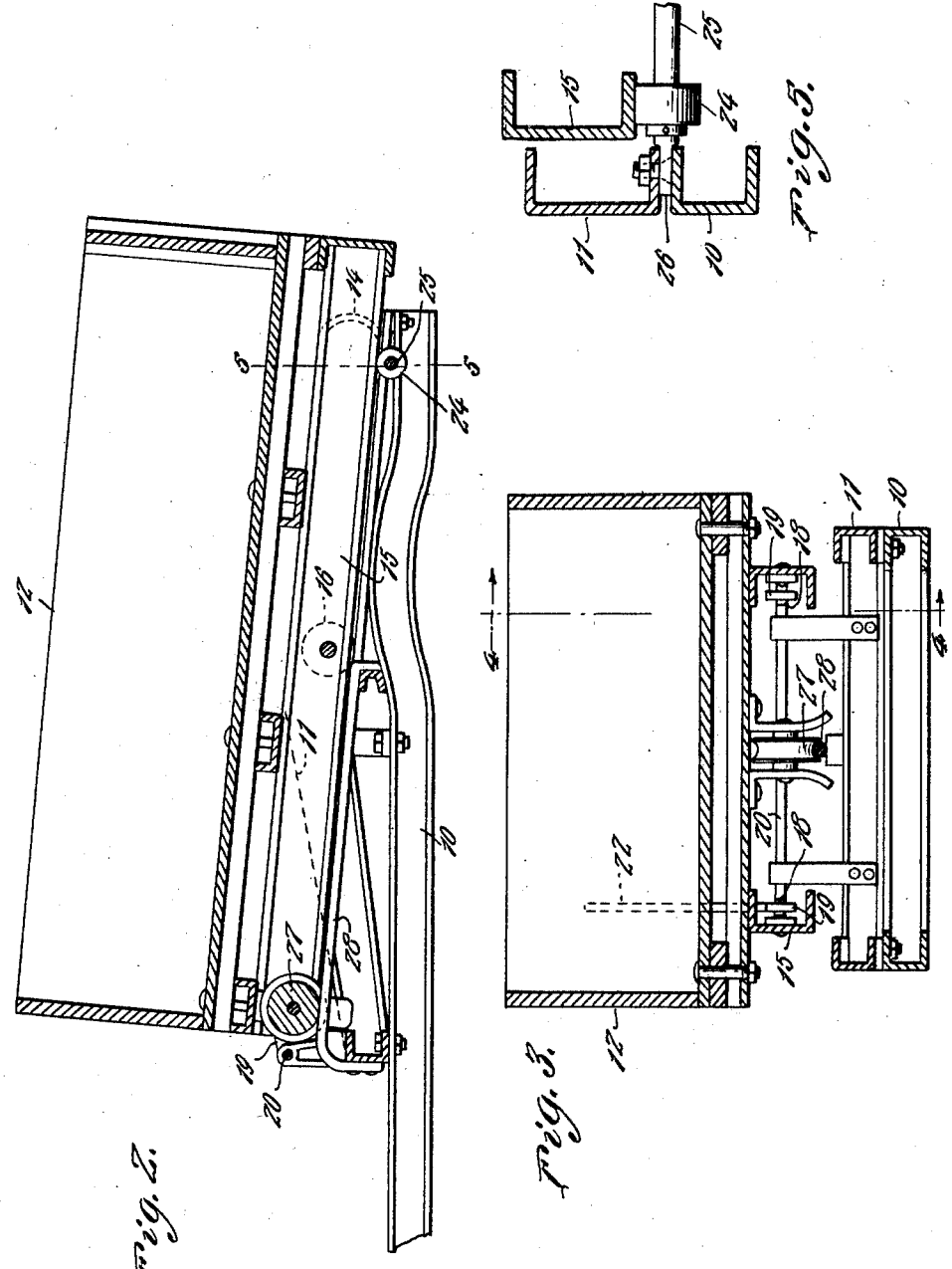

Patented May 7, 1929.

1,712,398

UNITED STATES PATENT OFFICE.

LOUIS M. PALMERO AND RICHARD G. JUNG, OF SEQUIN, TEXAS.

AUTOMATIC DUMPING MECHANISM FOR VEHICLES.

Application filed August 26, 1927. Serial No. 215,718.

This invention relates to dumping mechanisms for vehicles and more particularly to a novel construction of means for mounting the vehicle body to allow the latter to automatically gravitate to a dumping position when desired, the invention being especially designed for automotive vehicles.

In carrying out the invention, we contemplate the use of a latch means for holding the body normally positioned upon the frame of the vehicle, but at a slight inclination to the latter, so that when the latching means is operated to effect the release of the body, the latter will automatically slide and subsequently tilt to dumping position, being limited in its movement under such conditions.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary side elevation of a portion of a vehicle showing the normal position of the vehicle body in full lines, and in its dumping position by dotted lines.

Figure 2 is a longitudinal sectional view through Figure 1.

Figure 3 is a sectional view on line 3—3 of Figure 1.

Figure 4 is a sectional view on line 4—4 of Figure 3.

Figure 5 is a sectional view on line 5—5 of Figure 2.

Referring to the drawings in detail, 10 represents the side members of the vehicle frame, while mounted upon these side members are channel-like tracks 11, upon which the body indicated at 12 is mounted for sliding and tilting movement in a manner to be hereinafter described. The tracks 11 may be secured to the side members 10 of the vehicle frame in any suitable manner, but it will be noted upon inspection of Figure 1 that the body 12 is normally supported at a slight inclination to the frame of the vehicle, and held in this position by a latch mechanism to be hereinafter described. However, by reason of the inclination of the body, it is manifest that when it is released by the latch mechanism, the body will automatically slide and subsequently tilt to a predetermined dumping position as illustrated by dotted lines in Figure 1. By reference to Figure 4 it will be noted that each track member 11 is provided with a curved partition 13 at an appropriate point in its length, and a similar partition 14 adjacent the outer end, these partitions being utilized to limit the sliding movement of the body.

Carried by the bottom of the body are spaced channel-like bars 15 arranged in juxtaposition to the track members 11, and each of these bars 15 has journaled thereon a wheel 16 operating in the adjacent track 11. The wheels 16 at the opposite sides of the dumping body will normally engage the curved partition 13 in which position the body is supported in its normal position upon the frame of the vehicle as shown by full lines in Figure 1. The body is held in this position by a latch mechanism including plates 17 secured to the bars 15, each plate being provided with a pin 18 adapted to be engaged by a hook or dog 19 carried by a shaft 20 journaled in suitable brackets 21 secured to the track members 11. There are two of these hooks or dogs 19 mounted on the shaft 20, and the latter is also provided with a lever 22 adapted to be normally engaged by a ring 23 carried by the body as shown in Figure 1, the ring 23 holding the lever in an upright position when the dogs or hooks 19 engage with the pins 18. When it is desired to dump the body, it is only necessary to lift the ring 23 off the lever 22 and move the latter to the position illustrated by dotted lines in Figure 1, whereupon the shaft 20 is turned or rotated to disengage the hooks 19 from the pins 18, thereby releasing the body 12. By reason of the inclination at which the body is supported normally, the body gravitates along the track members 11, until the wheels 16 engage the curved stop partitions 14 engaging the outer ends of said track members as will be readily understood. At this point, the body 12 automatically tilts to the dotted line position shown in Figure 1, the bars 15 moving about relatively smaller supporting rollers 24.

These small supporting rollers 24 are mounted upon a shaft 25 the opposite ends of which are flattened as at 26 to be positioned between the side members 10 of the vehicle and the track members 11 to which they are bolted or otherwise suitably secured as clearly illustrated in Figure 5. The channel bars 15 secured to the underside of the body normally repose upon these small supporting rollers 24, and move over said rollers when the body is sliding along the track members 11. When the rollers 16 engage the stop partitions 14, the rollers 16 also move over the supporting rollers 24, and after passing over the centers of these small rollers 24, the body 12 tilts to the position shown by dotted lines in Figure 1.

Journaled beneath the body 12 in alinement with the longitudinal center thereof is a grooved guide roller 27 which operates over a guide rail 28 secured to the frame of the vehicle as clearly illustrated in Figures 2 and 3. This construction serves to guide the body 12 in its movement with relation to the frame.

While it is believed that from the foregoing description the nature and advantages of the invention will be readily understood, we desire to have it known that we do not limit ourselves to what is herein shown and described, and that such changes may be resorted to when desired as fall within the scope of what is claimed.

Having thus described the invention what we claim is:

In a dumping mechanism for vehicles, a frame including spaced side members, channel-like track members supported upon the frame members at an inclination thereto, a body, longitudinal bars secured to the underside of the body, wheels journaled on said bars and operating in said tracks, opposed curved partitions arranged in each track member and cooperating with said wheels to limit the movement of said body with relation to said tracks, a shaft arranged transversely of the frame members and having its ends flat, said flat ends being arranged between the side members of the frame and the track members, supporting rollers mounted on said shaft immediately adjacent one of said curved partitions and upon which the longitudinal bars of the body repose, said rollers constituting a fulcrum for said bars during the tilting of the body to a dumping position.

In testimony whereof we affix our signatures.

LOUIS M. PALMERO.
RICHARD G. JUNG.